US011012520B2

(12) United States Patent
Gunjal et al.

(10) Patent No.: US 11,012,520 B2
(45) Date of Patent: May 18, 2021

(54) MANAGE A NETWORK OF MICROSERVICES (71) Applicant: International Business Machines Corporation, Armonk, NY (US)

(72) Inventors: Akash V. Gunjal, Belgaum (IN); Neeraj Kumar Kashyap, Bangalore (IN); Pushpendra Singh Dahiya, New Delhi (IN); Himanshi, New Delhi (IN); Albee Jhoney, Bangalore (IN); Akanksha Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/298,363

(22) Filed: Mar. 11, 2019

(65) Prior Publication Data
US 2020/0296172 A1  Sep. 17, 2020

(51) Int. Cl.
*H04L 29/08* (2006.01)
*H04L 12/813* (2013.01)
*G06N 3/08* (2006.01)
*H04L 12/26* (2006.01)
*H04L 12/24* (2006.01)

(52) U.S. Cl.
CPC .............. *H04L 67/16* (2013.01); *G06N 3/08* (2013.01); *H04L 41/16* (2013.01); *H04L 43/16* (2013.01); *H04L 47/20* (2013.01); *H04L 67/10* (2013.01)

(58) Field of Classification Search
CPC ......... H04L 67/16; H04L 47/20; H04L 43/16; H04L 67/10; H04L 41/16; G06N 3/08
See application file for complete search history.

(56) References Cited

U.S. PATENT DOCUMENTS

| | | | |
|---|---|---|---|
| 2017/0046146 A1 | 2/2017 | Jamjoom | |
| 2018/0026856 A1* | 1/2018 | Yang | H04L 41/5019 709/224 |
| 2018/0270122 A1 | 9/2018 | Brown | |
| 2018/0288094 A1 | 10/2018 | Ahuja | |
| 2020/0112487 A1* | 4/2020 | Inamdar | H04L 67/22 |

OTHER PUBLICATIONS

Minkowski, "Microservices traffic management using Istio on Kubernetes," Piotr's TechBlog, May 2018, 14 pages.
Agrawal et al., "Learning From Graph Neighborhoods Using LSTMs," Technical Report UCSC-SOE-16-17, School of Engineering, UC Santa Cruz, Nov. 18, 2016, 9 pages.

* cited by examiner

*Primary Examiner* — Austin J Moreau
(74) *Attorney, Agent, or Firm* — VanLeeuwen & VanLeeuwen; William J. Stack

(57) ABSTRACT

An approach is provided in which an information handling system captures a set of performance metrics corresponding to a traffic flow through a set of microservices included in the service mesh. Next, the information handling system identifies one or more modifications to the traffic flow based on analyzing the set of performance metrics against a set of application requirements corresponding to the set of microservices. In turn, the information handling system adjusts a traffic routing policy of the service mesh based on the identified one or more modifications.

20 Claims, 9 Drawing Sheets

FIG. 1

Information Handling System Processor and Components

MANAGE A NETWORK OF MICROSERVICES

BACKGROUND

Microservices architectures involve designing applications as a suite of independently deployable, small, modular services, which are typically referred to as "microservices." Each microservice executes a unique process and communicates through a well-defined, lightweight mechanism to serve a business goal using communication protocols. The microservices architecture has become a preferred way of developing software systems, particularly those that operate in cloud-based environments.

Microservices may be deployed on a wide variety of cloud environments provided by different service providers. When an application is developed as a collection of multiple granular and reusable microservices, the deployment creates a "service mesh" with multiple connections between the consumers, microservices, and service providers. A service mesh is a network of microservices developed from applications and the interactions between the microservices.

The service mesh usually employs a service mesh traffic manager that monitors and manages the mesh of microservices. The service mesh traffic manager secures communications between microservices, monitors traffic, enforces policies, and enforces requirements such as discovery, load balancing, failure recovery, metrics, and monitoring. A challenge found is that the service mesh traffic manager has difficulty managing the service mesh as the service mesh increases in size and complexity, resulting in a non-optimized traffic flow through the service mesh.

BRIEF SUMMARY

According to one embodiment of the present disclosure, an approach is provided in which an information handling system captures a set of performance metrics corresponding to a traffic flow through a set of microservices deployed into a service mesh on a cloud environment. Next, the information handling system identifies one or more modifications to the traffic flow based on analyzing the set of performance metrics against a set of application requirements corresponding to the set of microservices. In turn, the information handling system adjusts a traffic routing policy of the service mesh based on the identified one or more modifications.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
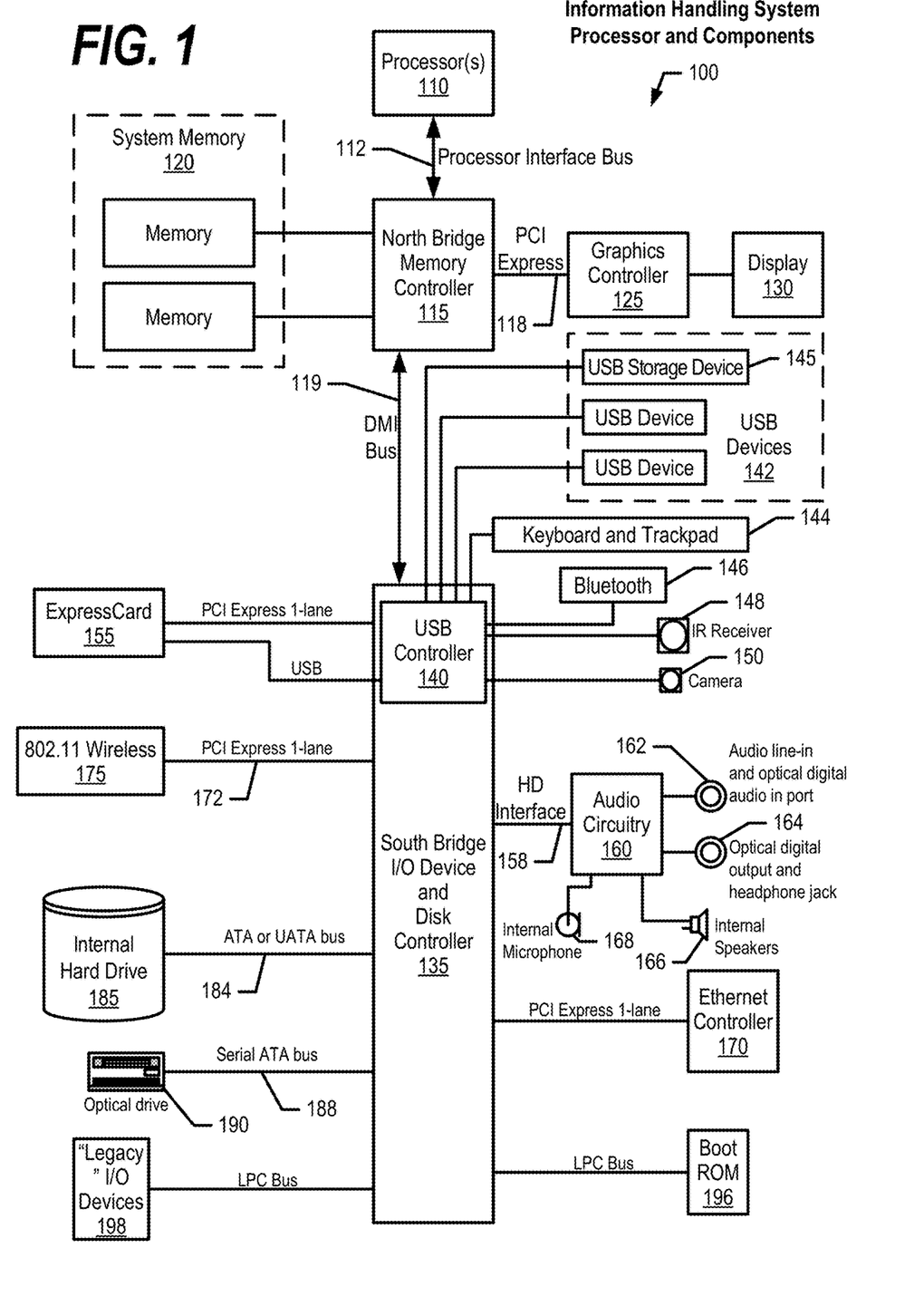
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
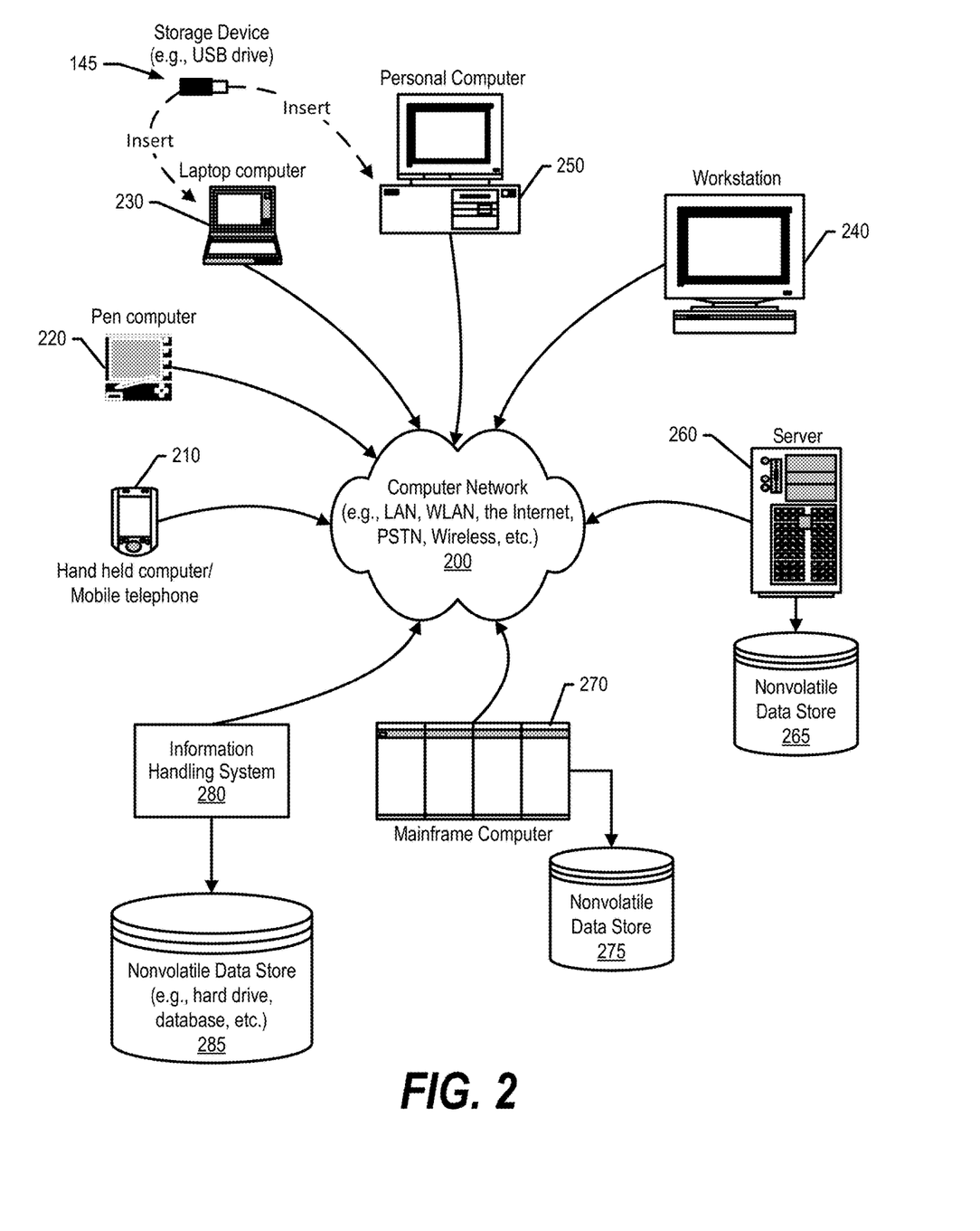
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a service mesh is a collection of multi-linked microservices and, as the service mesh grows in size and complexity, the service mesh becomes difficult to understand and manage. In addition, each microservice typically has its own development-test-release lifecycle that is managed by an independent team. For example, in a steady state, an application may have more than one version of microservices running simultaneously to cater to different users (e.g., dev-test-ops users, geo1-geo2 users, etc.). As a result, changes in the service mesh's microservices are introduced real-time in the application with no down time. Some of these changes may affect the quality of service offered by the overall application due to various reasons. In turn, the service mesh has difficulty automatically tuning (optimizing) itself and responding to disruptive changes by taking preventive and corrective actions.

As used herein, the term "microservice" refers to any software construct that: (i) is completely embodied in the code of a software program (as opposed to being code that is called by the software program from code that is not included in the software program itself; and (ii) is architecturally similar in its structure and context to a traditional service (may sometimes herein be referred to as a "microservice") used in SOA (service oriented architecture). While microservices are typically smaller than macroservices, there is not a determinative size limitation on the size of a "microservice."

FIGS. 3 through 9 depict an approach that can be executed on an information handling system that optimizes traffic flow in a service mesh based on a collection an analysis of microservices performance metrics. The approach employs an intelligent, autonomic, traffic management agent that identifies traffic flow issues in the service mesh and institutes preventive and corrective actions by dynamically adjusting the traffic management policies. The traffic management agent learns the characteristics of the service mesh traffic flow and also understands the nature of changes introduced in the service mesh, such as a new version of a microservice. In turn, the traffic management agent automatically tunes the traffic routing policy in the service mesh.

Figure 3:
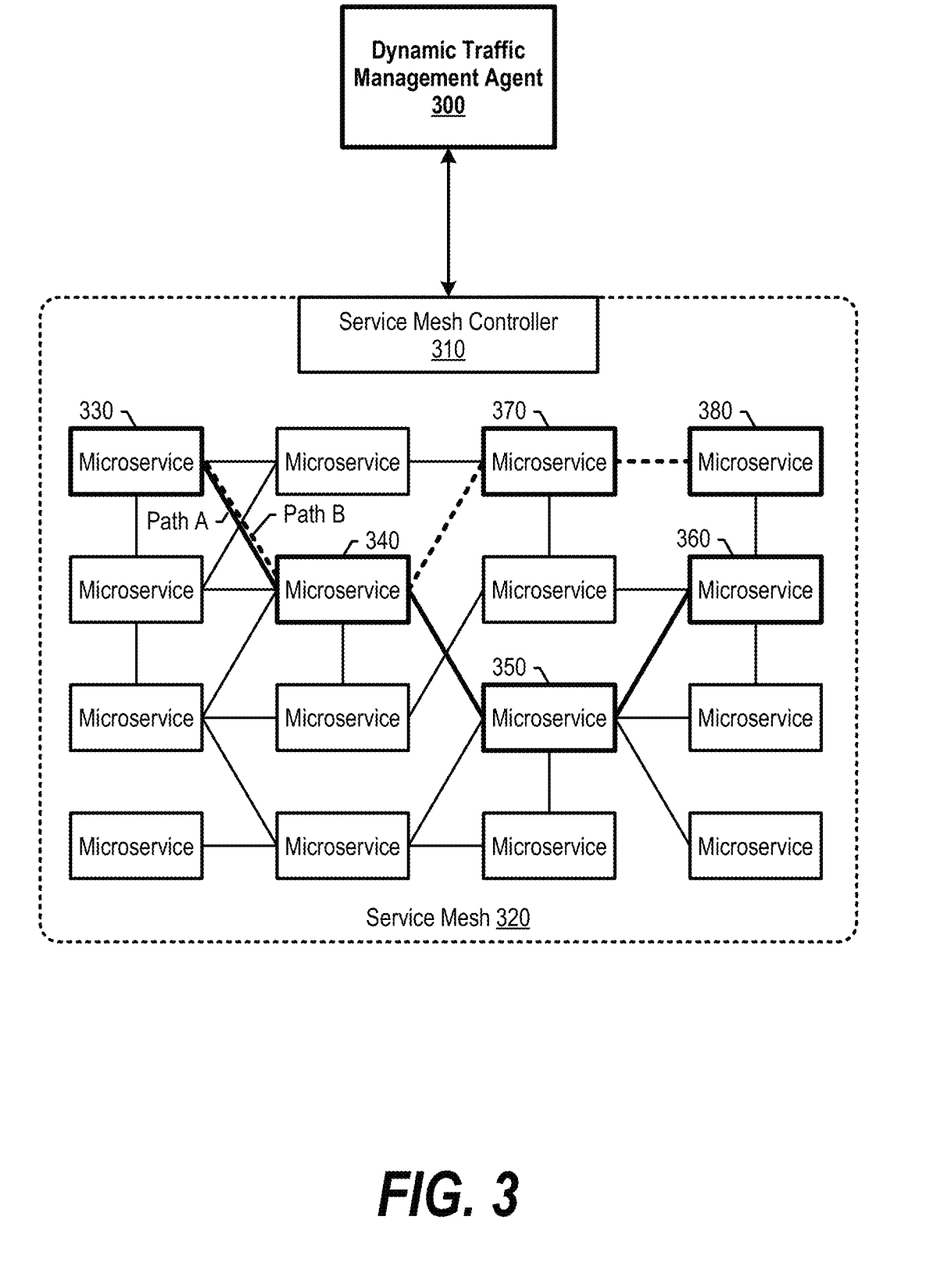
FIG. 3 is an exemplary diagram depicting a dynamic traffic management agent analyzing service mesh conditions and providing traffic management recommendations to a service mesh controller.

FIG. 3 is an exemplary diagram depicting a dynamic traffic management agent analyzing service mesh conditions and providing traffic management recommendations to a service mesh controller. Dynamic traffic management agent 300 interfaces with service mesh controller 310 to collect performance metrics of service mesh 320, such as request rates, error rates, and response rates of each of microservice included in service mesh 320.

Dynamic traffic management agent 300 continuously monitors the traffic-condition-tuples <request-rate, response-time, error-rate>, of each microservice and for the whole application. For the application (or external API), dynamic traffic management agent 300 continuously learns about temporal patterns in the traffic-condition-tuple using a recurrent neural network. For each microservice, dynamic traffic management agent 300 also continuously learns about patterns in a microservice's traffic-condition-tuple using the recurrent neural network and continuously learns about how the microservice's traffic-condition-tuple is affected by the patterns in adjacent microservice's traffic-condition-tuple (both upstream and downstream), using multi-level sequence learners (see FIG. 4 and corresponding text for further details).

In one embodiment, when a microservice and/or its neighbors is undergoing an administrator-initiated change, such as, add/remove new microservices, update traffic routing policies, etc., then dynamic traffic management agent 300 marks the microservice as a tainted-node, annotates the nodes with the microservices version numbers, and resets the learning models (continuously learnt using historical data) for the tainted-node.

Dynamic traffic management agent 300 analyzes the performance metrics and determines whether the traffic flow policy in service mesh 320 requires adjustments, such as when newer microservice versions are added and/or traffic flow is congested. FIG. 3 shows that the initial traffic flow (Path A) through service mesh 320 proceeds through microservice 330, to microservice 340, to microservice 350, and then to microservice 360. Dynamic traffic management agent 300 analyzes the traffic flow performance and determines that the traffic flow should divert from path A to path B because, for example, microservice 370 is a newer version of microservice 350. In one embodiment, an ISTIO side-car deployment tags versions of the microservice and dynamic traffic management agent 300 analyzes the tags to determine new microservice versions.

As such, dynamic traffic management agent 300 updates the service mesh controller 310's traffic routing policy and the traffic flow (Path B) now flows through microservice 330, to microservice 340, to microservice 370, and to microservice 380. As discussed in detail below, dynamic traffic management agent 300 continuously monitors service mesh 320 and proactively adjusts the traffic routing policy when dynamic traffic management agent 300 detects traffic flow issues in service mesh 320 (see FIGS. 5 through 9 and corresponding text for further details).

Figure 4:
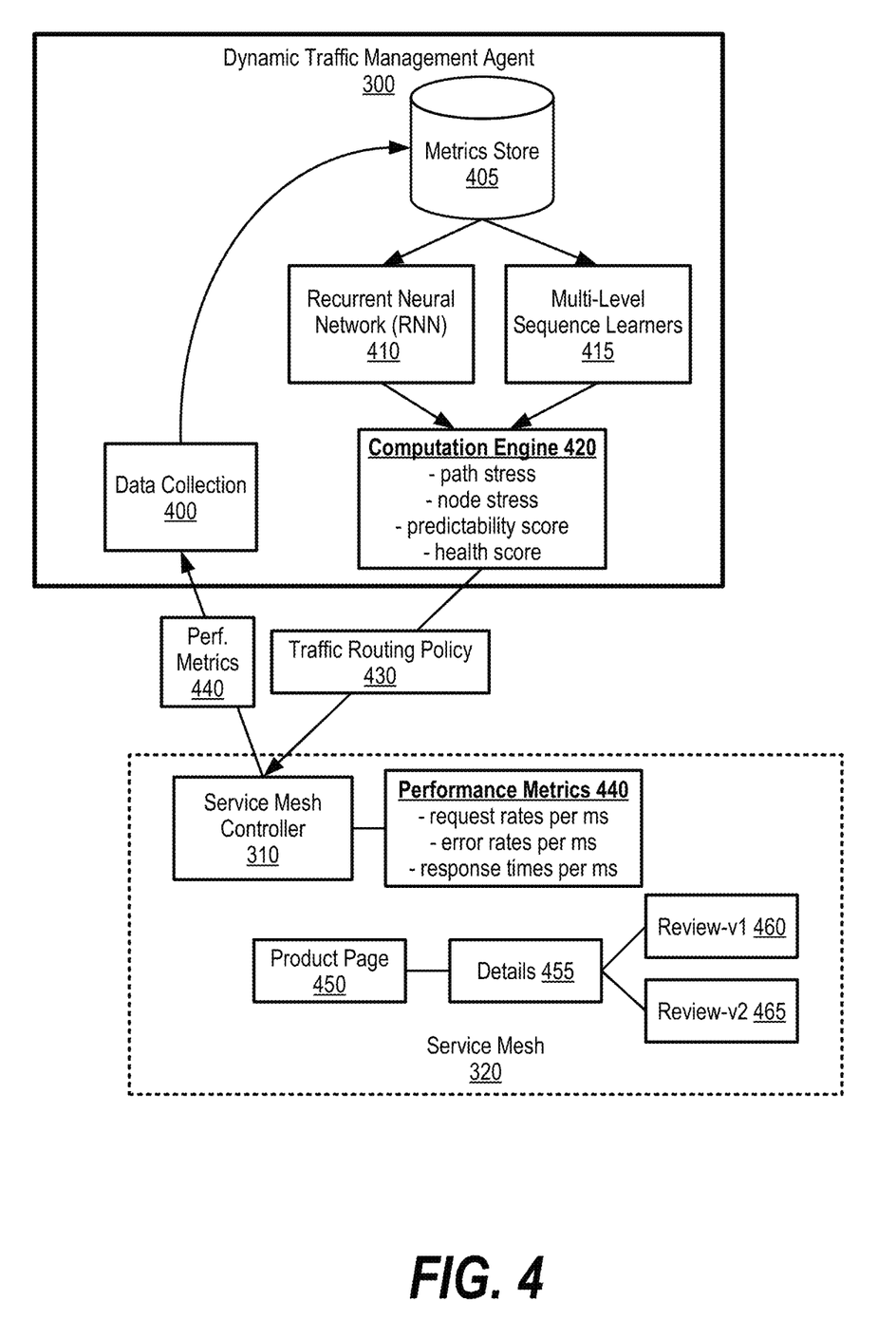
FIG. 4 is an exemplary diagram depicting a dynamic traffic management agent collecting service mesh performance metrics and informing a service mesh controller to adjust its traffic routing policy.

FIG. 4 is an exemplary diagram depicting a dynamic traffic management agent collecting service mesh performance metrics and informing a service mesh controller to adjust its traffic routing policy. As discussed herein, the service mesh performance metrics is a collection of individual microservice performance metrics.

Service mesh controller 310 monitors individual microservice performance metrics for each of microservices 450, 455, 460, and 465 in service mesh 320. Service mesh controller 310, in one embodiment, continuously collects the individual microservice performance metrics into performance metrics 440. The performance metrics includes, for example, a request rate, an error rate, and a response time for product page 450; a request rate, an error rate, and a response time for details 455; a request rate, an error rate, and a response time for review-V1 460; and a request rate, an error rate, and a response time for review-V2 465.

Data collection 400 collects performance metrics 440 and stores performance metrics 440 in metrics store 405. In turn, recurrent neural network 410 loads the performance metrics to learn bout the traffic pattern of the service mesh. In addition, multi-level sequence learners 415 learn about each node's neighborhood surroundings.

Computation engine 420 analyzes the outputs of RNN 410 and multi-level sequence learners 415 and computes path stresses, node stresses, predictability scores, and heath scores. Dynamic traffic management agent 300 then determines whether a traffic flow policy requires adjustment based on the computations. In turn, when adjustments are determined, dynamic traffic management agent 300 adjusts or creates a new traffic routing policy 430 and sends traffic routing policy 430 to service mesh controller 310, which implements the new traffic routing policy accordingly. For example, dynamic traffic management agent 300 may determine that review-v2 465 is a newer version of review-v1 460 and adjust the traffic flow policy to route traffic from details 455 to review-v2 465.

Figure 5:
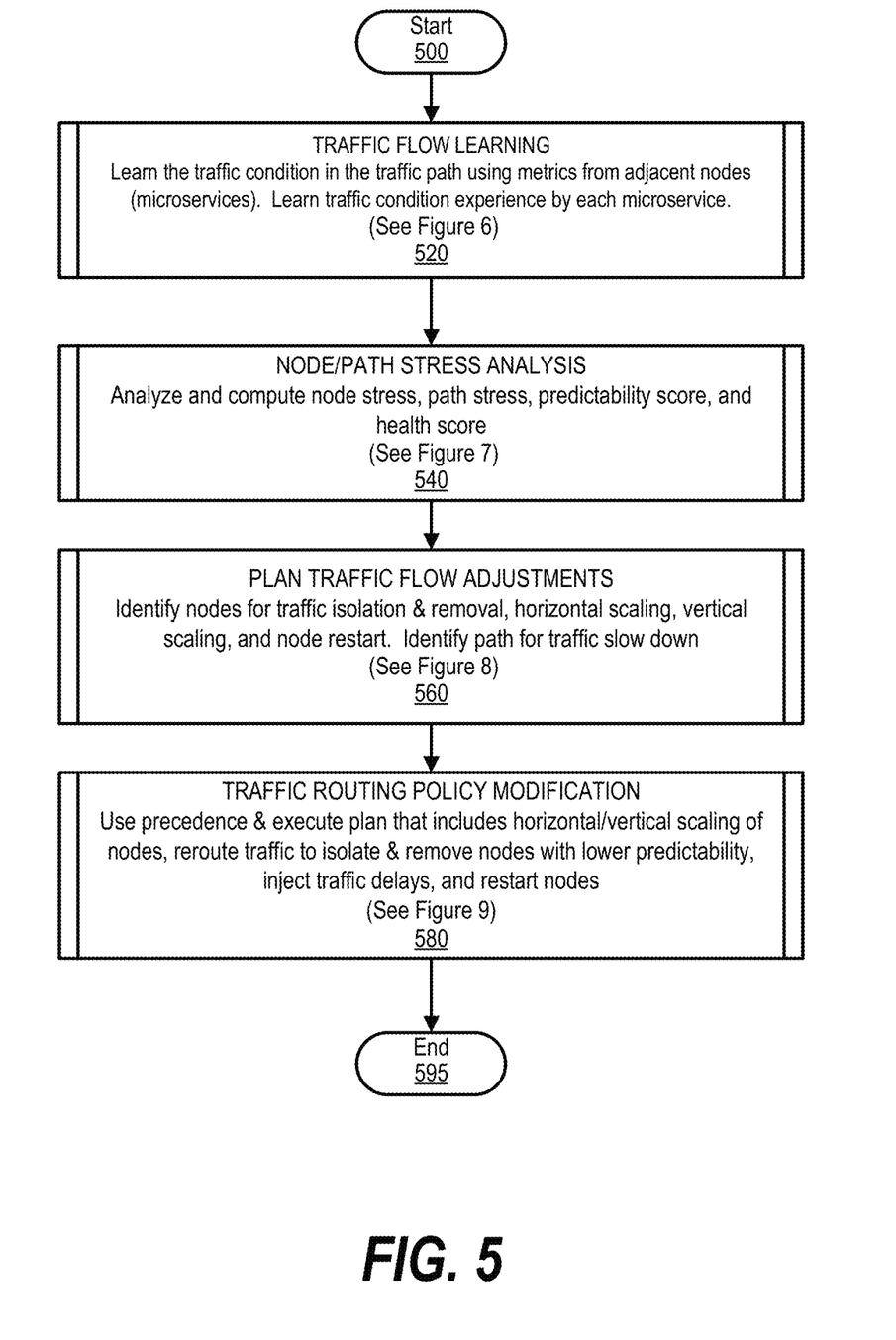
FIG. 5 is an exemplary high level flowchart showing steps to collect service mesh performance data and provide traffic routing policy adjustments.

FIG. 5 is an exemplary high level flowchart showing steps to collect service mesh performance data and provide traffic routing policy adjustments. FIG. 5 processing commences at 500 whereupon, at predefined process 520, the process learns the traffic flow conditions in the service mesh using metrics from adjacent nodes (microservices) and learns the traffic condition experience by each node (see FIG. 6 and corresponding text for processing details).

Figure 7:
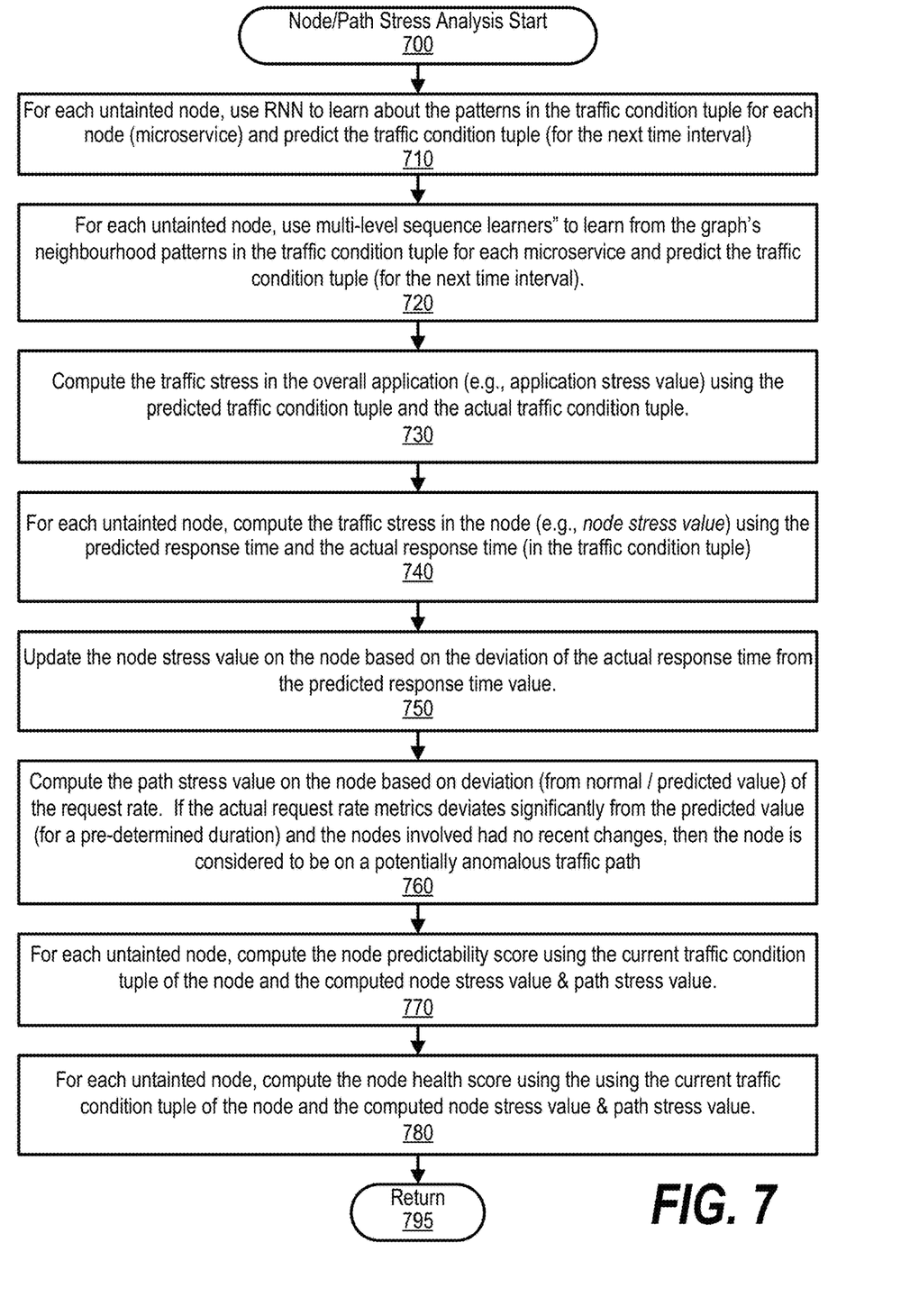
FIG. 7 is an exemplary flowchart showing steps taken to analyze the service mesh based on current traffic flow conditions.

At predefined process 540, the process analyzes and computes node stress, path stress, predictability score, and health score for the microservices in the service mesh (see FIG. 7 and corresponding text for processing details). At predefined process 560, the process identifies and plans for traffic flow adjustments based on the microservices analysis performed at predefined process 560 (see FIG. 8 and corresponding text for processing details).

At predefined process 580, the process modifies the service mesh's traffic routing policy based on the traffic flow planning adjustments from predefined process 560. In one embodiment, the traffic flow policy adjustments include horizontal/vertical scaling of nodes, rerouting traffic to isolate and remove nodes with lower predictability, inject traffic delays, and restart nodes (see FIG. 9 and corresponding text for processing details). FIG. 5 processing thereafter ends at 595.

Figure 6:
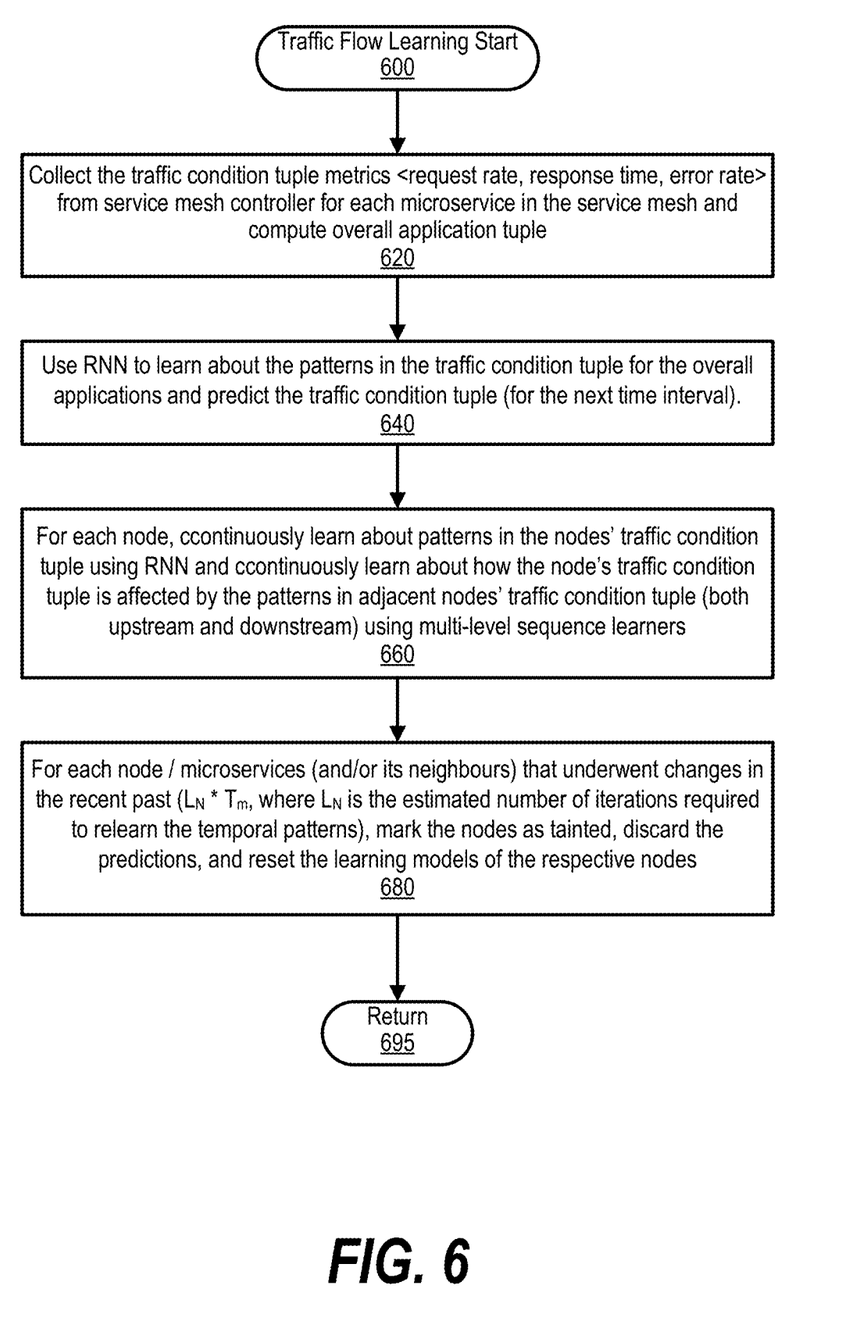
FIG. 6 is an exemplary flowchart showing steps taken to learn service mesh traffic flow conditions.

FIG. 6 is an exemplary flowchart showing steps taken to learn service mesh traffic flow conditions. FIG. 6 processing commences at 600 whereupon, at step 620, the process collects traffic condition metrics for each microservice, such as the tuple "<request rate, response time, error rate>," from service mesh controller 310 and computes an application tuple for the overall application (e.g., service mesh 320) based on the microservice metrics.

At step 640, the process uses recurrent neural network (RNN) 410 to learn about the patterns in the traffic condition tuple for the overall applications and predict the traffic condition tuple (for the next time interval). In one embodiment, the process uses a long-short term memory (LSTM) network as RNN 410.

At step 660, the process continuously learns about patterns for each node (microservice) in the nodes' traffic condition tuple using RNN 410 and continuously learns about how the node's traffic condition tuple is affected by the patterns in its adjacent nodes' traffic condition tuple (both upstream and downstream) using multi-level sequence learners 415 to learn the neighborhood of the various nodes.

At step 680, for each node/microservice (and/or its neighbors) that underwent changes in the recent past (LN * Tm, where LN is the estimated number of iterations required to relearn the temporal patterns), the process marks the nodes as tainted, discards the predictions, and resets the learning models of the respective nodes. In one embodiment, if there is any change in deployment then the process resets the learning of both RNN 410 and multi-level sequence learners 415 and begins the learning process again. FIG. 6 processing thereafter returns to the calling routine (see FIG. 5) at 695.

FIG. 7 is an exemplary flowchart showing steps taken to analyze the node/path stress in a service mesh based on current traffic flow conditions. FIG. 7 processing commences at 700 whereupon, at step 710, for each untainted node, the process uses RNN 410 to learn about the patterns in the traffic condition tuple for each node (microservice) and predict the traffic condition tuple (for the next time interval).

At step 720, for each untainted node, the process uses multi-level sequence learners 415 to learn from the graph's neighborhood patterns in the traffic condition tuple for each microservice and predict the traffic condition tuple (for the next time interval). At step 730, the process computes the traffic stress in the overall application (referred to herein as "application stress value") using the predicted traffic condition tuple and the actual traffic condition tuple monitored by service mesh controller 310, such as at an application Ingress sidecar.

At step 740, for each untainted node, the process computes the traffic stress for each untainted node (referred to herein as "node stress value") using the predicted response time and the actual response time (in the traffic condition tuple) monitored by service mesh controller 310 for each microservice. At step 750, the process updates the node stress value on the node based on the deviation of the actual response time from the predicted response time value.

At step 760, the process computes the path stress value on the node based on a deviation the normal value and the predicted value of the request rate. If the actual request rate metrics deviates significantly from the predicted value (for a pre-determined duration) and the nodes involved had no recent changes, then the node is considered to be on a potentially anomalous traffic path.

At step 770, for each untainted node, the process computes a node predictability score using the current traffic condition tuple of the node and the computed node stress value and path stress value. At step 780, for each untainted node, the process computes the node health score using the current traffic condition tuple of the node and the computed node stress value and path stress value. FIG. 7 processing thereafter returns to the calling routine (see FIG. 5) at 795.

Figure 8:
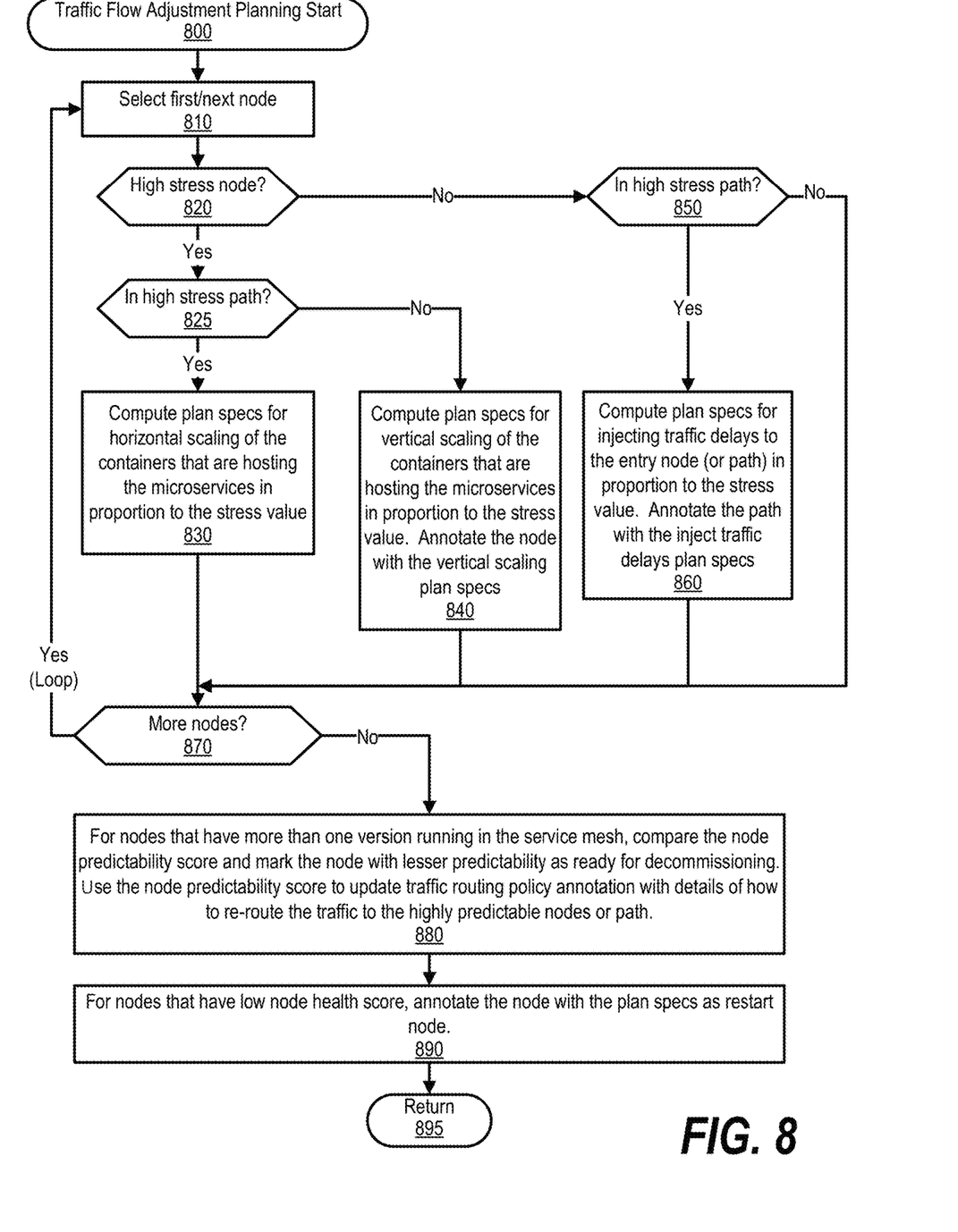
FIG. 8 is an exemplary flowchart showing steps taken to adjust traffic flow conditions in a service mesh based on analyzing current service mesh conditions.

FIG. 8 is an exemplary flowchart showing steps taken to plan traffic flow enhancements in a service mesh based on analyzing current service mesh conditions. FIG. 8 processing commences at 800 whereupon, at step 810, the process selects a first node in a high stress path. The process determines as to whether the node is high stress node, such as determining if its node stress value is in the 90 percentile (decision 820). If the node is a high stress node, then decision 820 branches to the 'yes' branch whereupon the process determines as to whether the node resides in a high stress path such as determining if its path stress value is in the 90 percentile (decision 825).

If the node resides in a high stress path, then decision 825 branches to the 'yes' branch whereupon, at step 830, the process computes plan specs for horizontal scaling of the containers that are hosting the microservices in proportion to the stress value. In one embodiment, the process scales horizontally by increasing the replication of the microservice instances to manage the high load of traffic on that microservice.

On the other hand, if the node does not reside in a high stress path, then decision 825 branches to the 'no' branch whereupon, at step 840, the process computes plan specs for vertical scaling of the containers that are hosting the microservices in proportion to the stress value. For example, if the node is under stress it means node has less resources than required and the provides more resources to the node such as CPU, memory, etc. (vertical scaling).

Referring back to decision 820, if the selected node is not a high stress node, then decision 820 branches to the 'no' branch whereupon the process determines as to whether the node resides in a high stress path (decision 850). If the node resides in a high stress path, then decision 850 branches to the 'yes' branch whereupon, at step 860, the process computes plan specs for injecting traffic delays to the entry node (or path) in proportion to the stress value to control the inflow of request at the entry point. In addition, the process annotates the path with the inject traffic delays plan specs. On the other hand, if the node is not in a high stress path, then decision 850 branches to the 'no' branch bypassing step 860.

The process determines as to whether there are more untainted nodes to evaluate (decision 870). If there are more untainted nodes to evaluate, then decision 870 branches to the 'yes' branch which loops back to select and process the next node. This looping continues until there are no more untainted nodes to evaluate, at which point decision 870 branches to the 'no' branch exiting the loop.

At step 880, for the nodes that have more than one version running in the service mesh, the process compares their corresponding node predictability scores and marks the nodes with lesser predictability as ready for decommissioning. The process uses the node predictability score to update the traffic routing policy annotation with details of how to re-route the traffic to the highly predictable nodes or path.

At step 890, for the nodes that have low node health scores, the process annotates the nodes with the plan specs as a restart node because the node is not healthy and will not be serving requests. FIG. 8 processing thereafter returns to the calling routine (see FIG. 5) at 895.

Figure 9:
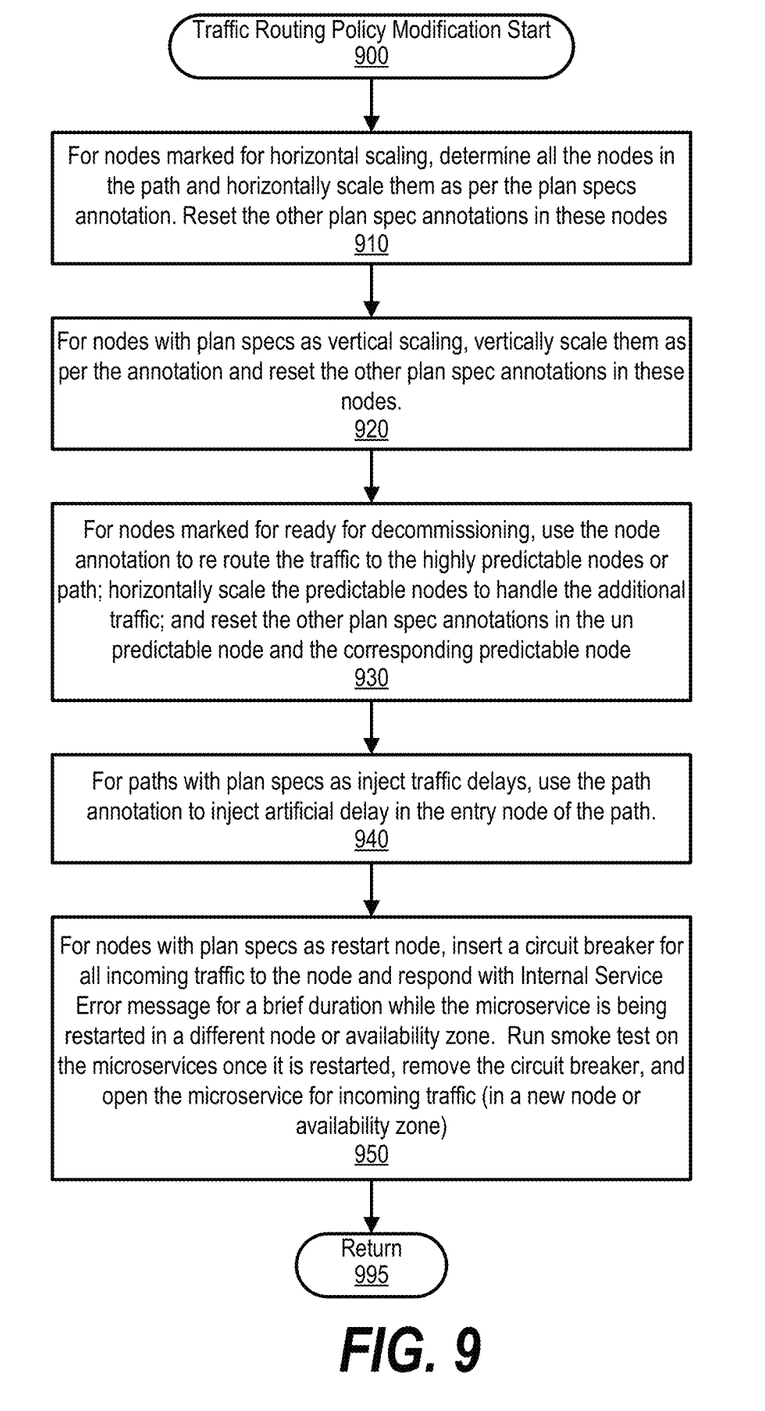
FIG. 9 is an exemplary flowchart showing steps taken to modify a traffic routing policy based on identified traffic flow adjustment recommendations.

FIG. 9 is an exemplary flowchart showing steps taken to enhance traffic flow in a service mesh by adjusting a traffic routing policy based on identified traffic flow adjustment recommendations. FIG. 9 processing commences at 900 whereupon, at step 910, for the nodes marked for horizontal scaling, the process (e.g., service mesh controller 310) determines all the nodes in the path and horizontally scales them as per the plan specs annotation (e.g., increasing replica to manage high load of traffic on the microservice). The process also resets the other plan spec annotations in these nodes.

At step 920, for the nodes with plan specs marked as vertical scaling, the process vertically scales them as per the annotation and resets the other plan spec annotations in these nodes. At step 930, for the nodes marked ready for decommissioning, the process uses the node annotation to re-route the traffic to the highly predictable nodes or path. In addition, the process horizontally scales the predictable nodes to handle the additional traffic and resets the other plan spec annotations in the unpredictable node and the corresponding predictable node.

At step 940, for the nodes with plan specs as inject traffic delays, the process uses the path annotation to inject artificial delay in the entry node of the path. At step 950, for the nodes with plan specs as restart node, the process inserts a circuit breaker for all incoming traffic to the node and responds with an internal service error message for a brief duration while the microservice is being restarted in a different node or availability zone. The process runs a smoke test on the microservice once it is restarted, removes the circuit breaker, and opens the microservice for incoming traffic (in a new node or availability zone). FIG. 9 processing thereafter returns to the calling routine (see FIG. 5) at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

capturing a set of performance metrics corresponding to a set of microservices deployed into a service mesh on a cloud environment, wherein the set of performance metrics corresponds to a traffic flow through the service mesh;

training a recurrent neural network using the set of performance metrics;

computing a predicted traffic condition tuple at a first one of the set of microservices based on the trained recurrent neural network, wherein the predicted traffic condition tuple comprises a set of predicted elements;

identifying one or more enhancements to the traffic flow based on analyzing the set of performance metrics against a set of application requirements corresponding to the set of microservices, wherein the identifying further comprises:

determining an actual traffic condition tuple of the first microservice based on subset of the set of performance metrics corresponding to the first microservice, wherein the actual traffic condition tuple comprises a set of actual elements;

computing a node stress value at the first microservice based on comparing a first one of the set of predicted elements against a first one of the set of actual elements; and computing a path stress value corresponding to a path that comprises the first microservice based on a deviation between a second one of the set of predicted elements and a second one of the set of actual elements; and adjusting a traffic routing policy of the service mesh based on the identified one or more enhancements.

2. The method of claim 1 wherein the traffic flow routes through the first microservice, the method further comprising:

identifying a second microservice in the set of microservices;

determining that the second microservice is a newer version of the first microservice; and adding one of the one more enhancements to the traffic routing policy that reroutes the traffic flow to the second microservice.

3. The method of claim 1 further comprising:

wherein the set of predicted elements comprises a predicted request rate, a predicted response time, and a predicted error rate; and wherein the set of actual elements comprises an actual request rate, an actual response time, and an actual error rate.

4. The method of claim 1 further comprising:

determining that the first microservice is a high stress node based on comparing the node stress value against a node stress threshold;

determining that the first microservice belongs to a high stress path based on comparing the path stress value against a path stress threshold; and adding one of the one more enhancements to a traffic flow adjustment that recommends horizontally scaling the first microservice in response to determining that the first microservice is the high stress node and belongs to the high stress path.

5. The method of claim 1 further comprising:
determining that the first microservice is a high stress node based on comparing the node stress value against a node stress threshold;
determining that the first microservice belongs to a low stress path based on comparing the path stress value against a path stress threshold; and
adding one of the one more enhancements to the traffic routing policy that adds one or more resources to the first microservice in response to determining that the first microservice is the high stress node and belongs to the low stress path.

6. The method of claim 1 further comprising:
determining that the first microservice is a low stress node based on comparing the node stress value against a node stress threshold;
determining that the first microservice belongs to a high stress path based on comparing the path stress value against a path stress threshold; and
adding one of the one more enhancements to the traffic routing policy that inserts one or more traffic delays to an entry point of the traffic flow in response to determining that the first microservice is the low stress node and belongs to the high stress path.

7. The method of claim 1 further comprising:
training a set of multi-level sequence learners using the set of performance metrics;
determining one or more neighborhood patterns of one or more adjacent microservices of the first microservice based on the trained set of multi-level sequence learners; and
using the one or more neighborhood patterns during the computing of the predicted traffic condition tuple.

8. An information handling system comprising:
one or more processors;
a memory coupled to at least one of the processors;
a set of computer program instructions stored in the memory and executed by at least one of the processors in order to perform actions of:
  capturing a set of performance metrics corresponding to a set of microservices deployed into a service mesh on a cloud environment, wherein the set of performance metrics corresponds to a traffic flow through the service mesh;
  training a recurrent neural network using the set of performance metrics;
  computing a predicted traffic condition tuple at a first one of the set of microservices based on the trained recurrent neural network, wherein the predicted traffic condition tuple comprises a set of predicted elements;
  identifying one or more enhancements to the traffic flow based on analyzing the set of performance metrics against a set of application requirements corresponding to the set of microservices, wherein the identifying further comprises:
    determining an actual traffic condition tuple of the first microservice based on subset of the set of performance metrics corresponding to the first microservice, wherein the actual traffic condition tuple comprises a set of actual elements;
    computing a node stress value at the first microservice based on comparing a first one of the set of predicted elements against a first one of the set of actual elements; and
    computing a path stress value corresponding to a path that comprises the first microservice based on a deviation between a second one of the set of predicted elements and a second one of the set of actual elements; and
  adjusting a traffic routing policy of the service mesh based on the identified one or more enhancements.

9. The information handling system of claim 8 wherein the traffic flow routes through the first microservice, and wherein the processors perform additional actions comprising:
identifying a second microservice in the set of microservices;
determining that the second microservice is a newer version of the first microservice; and
adding one of the one more enhancements to the traffic routing policy that reroutes the traffic flow to the second microservice.

10. The information handling system of claim 8 wherein the processors perform additional actions comprising:
wherein the set of predicted elements comprises a predicted request rate, a predicted response time, and a predicted error rate; and
wherein the set of actual elements comprises an actual request rate, an actual response time, and an actual error rate.

11. The information handling system of claim 8 wherein the processors perform additional actions comprising:
determining that the first microservice is a high stress node based on comparing the node stress value against a node stress threshold;
determining that the first microservice belongs to a high stress path based on comparing the path stress value against a path stress threshold; and
adding one of the one more enhancements to a traffic flow adjustment that recommends horizontally scaling the first microservice in response to determining that the first microservice is the high stress node and belongs to the high stress path.

12. The information handling system of claim 8 wherein the processors perform additional actions comprising:
determining that the first microservice is a high stress node based on comparing the node stress value against a node stress threshold;
determining that the first microservice belongs to a low stress path based on comparing the path stress value against a path stress threshold; and
adding one of the one more enhancements to the traffic routing policy that adds one or more resources to the first microservice in response to determining that the first microservice is the high stress node and belongs to the low stress path.

13. The information handling system of claim 8 wherein the processors perform additional actions comprising:
determining that the first microservice is a low stress node based on comparing the node stress value against a node stress threshold;
determining that the first microservice belongs to a high stress path based on comparing the path stress value against a path stress threshold; and
adding one of the one more enhancements to the traffic routing policy that inserts one or more traffic delays to an entry point of the traffic flow in response to determining that the first microservice is the low stress node and belongs to the high stress path.

14. The information handling system of claim 8 wherein the processors perform additional actions comprising:
training a set of multi-level sequence learners using the set of performance metrics;

determining one or more neighborhood patterns of one or more adjacent microservices of the first microservice based on the trained set of multi-level sequence learners; and using the one or more neighborhood patterns during the computing of the predicted traffic condition tuple.

15. A computer program product stored in a computer readable storage medium, comprising computer program code that, when executed by an information handling system, causes the information handling system to perform actions comprising:

capturing a set of performance metrics corresponding to a set of microservices deployed into a service mesh on a cloud environment, wherein the set of performance metrics corresponds to a traffic flow through the service mesh;

training a recurrent neural network using the set of performance metrics;

computing a predicted traffic condition tuple at a first one of the set of microservices based on the trained recurrent neural network, wherein the predicted traffic condition tuple comprises a set of predicted elements;

identifying one or more enhancements to the traffic flow based on analyzing the set of performance metrics against a set of application requirements corresponding to the set of microservices, wherein the identifying further comprises:

determining an actual traffic condition tuple of the first microservice based on subset of the set of performance metrics corresponding to the first microservice, wherein the actual traffic condition tuple comprises a set of actual elements;

computing a node stress value at the first microservice based on comparing a first one of the set of predicted elements against a first one of the set of actual elements; and computing a path stress value corresponding to a path that comprises the first microservice based on a deviation between a second one of the set of predicted elements and a second one of the set of actual elements; and adjusting a traffic routing policy of the service mesh based on the identified one or more enhancements.

16. The computer program product of claim 15 wherein the traffic flow routes through the first microservice, and wherein the information handling system performs further actions comprising:

identifying a second microservice in the set of microservices;

determining that the second microservice is a newer version of the first microservice; and adding one of the one more enhancements to the traffic routing policy that reroutes the traffic flow to the second microservice.

17. The computer program product of claim 15 wherein the information handling system performs further actions comprising:

wherein the set of predicted elements comprises a predicted request rate, a predicted response time, and a predicted error rate; and wherein the set of actual elements comprises an actual request rate, an actual response time, and an actual error rate.

18. The computer program product of claim 15 wherein the information handling system performs further actions comprising:

determining that the first microservice is a high stress node based on comparing the node stress value against a node stress threshold;

determining that the first microservice belongs to a high stress path based on comparing the path stress value against a path stress threshold;

adding one of the one more enhancements to a traffic flow adjustment that recommends horizontally scaling the first microservice in response to determining that the first microservice is the high stress node and belongs to the high stress path.

19. The computer program product of claim 15 wherein the information handling system performs further actions comprising:

determining that the first microservice is a high stress node based on comparing the node stress value against a node stress threshold;

determining that the first microservice belongs to a low stress path based on comparing the path stress value against a path stress threshold;

adding one of the one more enhancements to the traffic routing policy that adds one or more resources to the first microservice in response to determining that the first microservice is the high stress node and belongs to the low stress path.

20. The computer program product of claim 15 wherein the information handling system performs further actions comprising:

determining that the first microservice is a low stress node based on comparing the node stress value against a node stress threshold;

determining that the first microservice belongs to a high stress path based on comparing the path stress value against a path stress threshold;

adding one of the one more enhancements to the traffic routing policy that inserts one or more traffic delays to an entry point of the traffic flow in response to determining that the first microservice is the low stress node and belongs to the high stress path.

* * * * *